United States Patent [19]

Bloem

[11] 4,348,793
[45] Sep. 14, 1982

[54] METHOD OF CONNECTING A PLATE-SHAPED ABSORBER FOR SOLAR HEAT TO A TUBULAR HEAT TRANSPORT SYSTEM

[75] Inventor: Herman Bloem, Eindhoven, Netherlands

[73] Assignee: U.S. Philips Corporation, New York, N.Y.

[21] Appl. No.: 158,001

[22] Filed: Jun. 9, 1980

[30] Foreign Application Priority Data

Jun. 29, 1979 [NL] Netherlands .......................... 7905056

[51] Int. Cl.³ ............................................. B23P 15/26
[52] U.S. Cl. ........................... 29/157.3 A; 29/157.3 C; 165/181; 165/183
[58] Field of Search ............ 113/118 V, 118 B, 118 C, 113/118 D, 118 A; 29/157.3 A, 157.3 C; 165/181, 182, 183

[56] References Cited

U.S. PATENT DOCUMENTS 4,182,013  1/1980  Grossman .......................... 29/157.3

Primary Examiner—Francis S. Husar
Assistant Examiner—V. K. Rising
Attorney, Agent, or Firm—Thomas A. Briody; William J. Streeter; Rolf E. Schneider

[57] ABSTRACT

A solar collector is made from a straight tubular metal heat pipe having an evaporator section and a condenser section and two elongate flat solar-heat metal absorber plates. A plurality of equally spaced parallel cuts is formed in each plate, with the cuts extending transversely of the longitudinal direction of each plate. The two plates are disposed one on the other with their respective parallel cuts in alignment; and alternate portions between consecutive cuts are deformed in opposite directions to provide alternate oppositely disposed semi-cylindrical portions. The evaporator section of the heat pipe is inserted into the resulting cylindrical space; and the semi-cylindrical portions are mechanically pressed against the evaporator section. The two plates are then bent away from each other into an outwardly extending X-shape.

2 Claims, 12 Drawing Figures

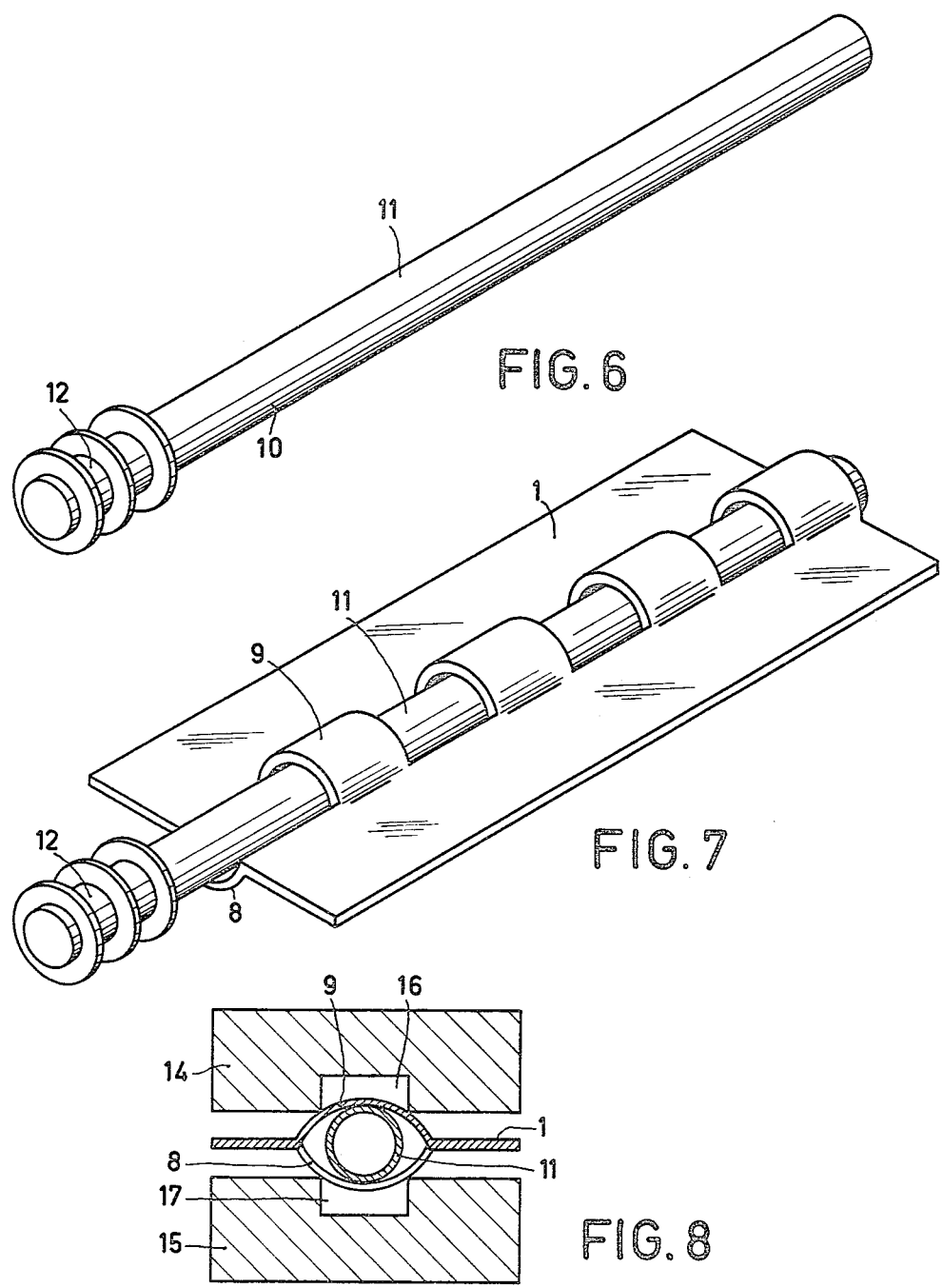

METHOD OF CONNECTING A PLATE-SHAPED ABSORBER FOR SOLAR HEAT TO A TUBULAR HEAT TRANSPORT SYSTEM

This invention relates to a method of connecting at least one plate-shaped absorber for solar heat to a tubular part of a heat transport system which contains a working medium for the transport of heat.

U.S. Pat. No. 4,133,298 describes a solar collector which comprises a solar heat absorbing plate-shaped absorber which is thermally conductively connected to the evaporator section of a heat pipe which contains a working medium which transfers the absorbed heat to the condenser section of the pipe which can be made to exchange heat with a further heat transport system. The plate-shaped absorber and the evaporator section of the heat pipe are enveloped by a glass envelope in which a subatmospheric pressure prevails. The absorber is connected to the heat pipe by way of soldering.

The present invention has for its object to provide a method which is simpler and less expensive and which affords a suitably rigid combination which is not subject to warping at elevated temperatures and which ensures suitable transfer of heat between the absorber plate and the pipe.

The method in accordance with the invention is characterized in that an elongate absorber plate is provided with a number of parallel cuts which are situated at regular distances from each other and which extend transversely of the longitudinal direction of the plate, after which the plate portions situated between the cuts are pressed out of the plane of the plate so that the respective portions situated on either side of a cut are pressed to different sides of the plate, after which the tubular part is slid between the deflected plate portions.

A suitably thermally conductive connection can thus be realized between the absorber plate and the tubular part by means of very simple means, the assembly being very rigid and free of warping, even at elevated temperatures, because the absorber plate symmetrically encloses the heat pipe.

If the pipe is not retained in a clamping manner after having been slid between the plate portions, the relevant plate portions are pressed against the tube in a clamping manner during a next procedural phase in accordance with the invention.

In a further preferred embodiment, the deflected plate portions have a radius of curvature which exceeds that of the tubular part, the respective portions on either side of the pipe being pressed towards the plane of the plate during which they are at least locally plastically deformed. Thus, suitable clamping is achieved and also suitable contacting of the tubular part by the plate portions.

In order to prevent the clamping effect between the plate portions and the tubular part from being lost at elevated temperatures, in a further embodiment in accordance with the invention the material of the absorber plate is chosen so that the plate maintains its resilience at least at the maximum temperature occurring during operation.

Instead of using one plate, the present method can also be performed with a plurality of plates which are arranged one on the other. After the connection to the tubular part, the plates can be deflected until they all extend more or less radially with respect to the pipe.

A further method of connecting two plates to a tubular part in accordance with the invention is characterized in that each of the two absorber plates is provided along its longitudinal axis with similar cut-outs which are situated at mutually equal distances from each other, after which the plate portions remaining between the cut-outs are all pressed out of the plane of the relevant plate to the same side, after which the two plates are fitted one into the other by way of the extruded portions and the tubular part is slid therebetween, after which these portions are firmly pressed again, if necessary, and the plates are bent one away from the other.

The invention will now be described in detail with reference to the accompanying drawings, in which:

FIG. 6 is a perspective view of a heat pipe.

FIG. 7 is a perspective view of a combination of a heat pipe and an absorber plate.

FIG. 8 is a sectional view of a further pressing device.

Figure 1:
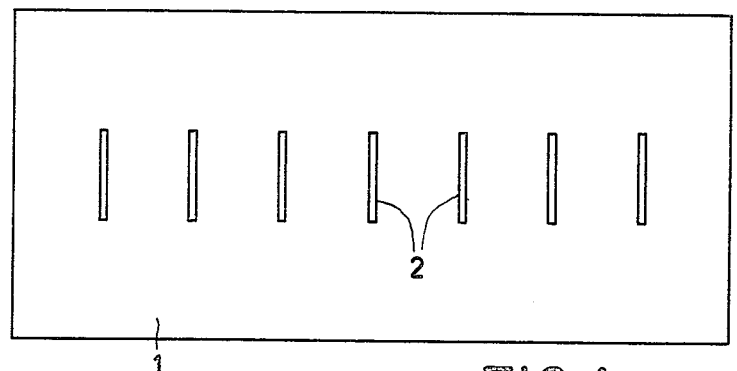
FIG. 1 shows an absorber plate with cuts.

FIG. 1 diagrammatically shows a flat plate-shaped absorber 1 which is made of metal, for example, aluminium and one side of which is provided with a black layer, for example, a layer which selectively absorbs solar heat.

This plate is provided at regular distances with cuts 2 by means of a punching or cutting operation.

Figure 2:
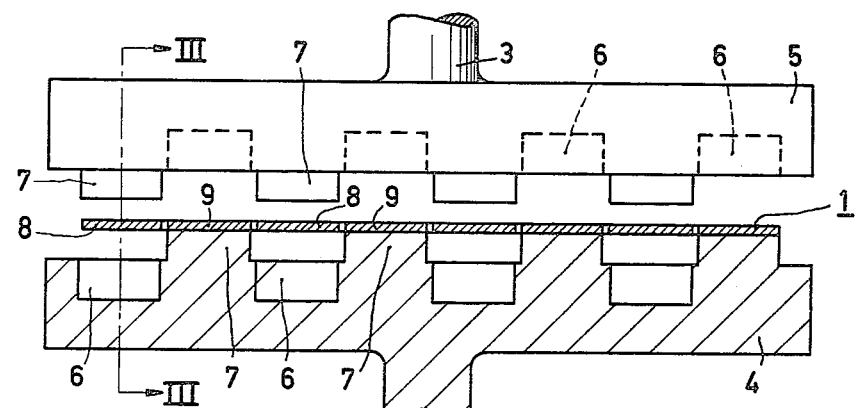
FIGS. 2 and 3 are sectional views of a pressing device, FIG. 3 being taken along line III—III of FIG. 2.
Figure 3:
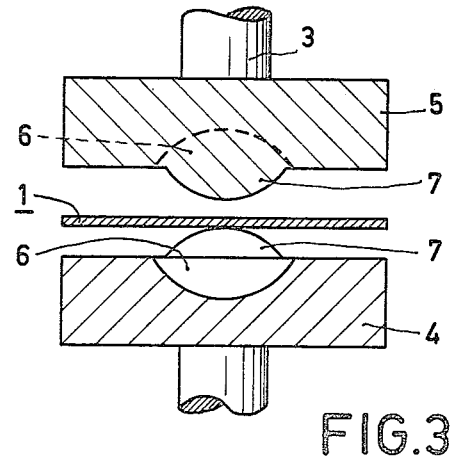

As shown in FIGS. 2 and 3, the plate 1 with the cuts 2 is inserted into a pressing device 3 (not further elaborated). The pressing device comprises a lower die 4 and an upper die 5, which are each provided over their full width with alternating cavities 6 and projections 7, the shape of which corresponds to that of the cavities 6.

The projections 7 on the respective dies are arranged so that they strike only every other plate portion 8, 9 between the cuts 2. During pressing, therefore, the plate portions 9, 8 are pressed alternately upwards and downwards out of the plane of the plate 1.

Figure 4:
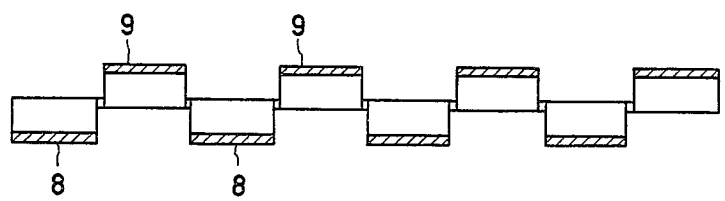
FIGS. 4 and 5 are a sectional view and a perspective view, respectively, of an absorber plate having portions which have been extruded to both sides.
Figure 5:
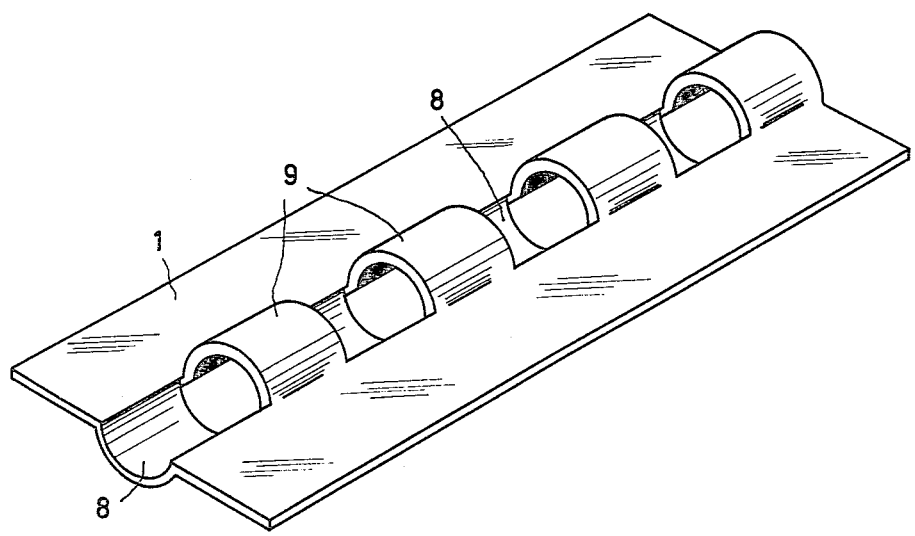

The result is shown in the sectional view in FIG. 4 and in the perspective view in FIG. 5.

The evaporator section 11 of a straight heat pipe 10 (see FIG. 6) is then slid into the channel thus formed by the deflected plate portions 8 and 9. The condenser section 12 remains free. The diameter of the heat pipe 10 is slightly smaller than the diameter of the channel enclosed by the portions 8 and 9. This means that initially the heat pipe is rather loosely arranged between the portions 8 and 9.

In order to obtain suitable clamping of the heat pipe, the assembly formed by the plate 1 and the heat pipe 10 is subsequently introduced into a pressing device which is shown in a sectional view in FIG. 8. This pressing device comprises two dies 14 and 15. The dies 14 and 15 include a trough-shaped recess 16, 17, respectively, having a rectangular cross-section and a width which is slightly larger than the diameter of the section 11 of the heat pipe 10 and a depth which is approximately equal to half the diameter of the section 11. When the dies are closed, the sharp edges of the recesses 17 and 16 will press the portions 8 and 9, respectively, against the heat pipe 10, the portions 8 and 9 then being plastically deformed so that after the opening of the dies, the portions 8 and 9 are clamped against the section 11 of the heat pipe. A very intimate thermal contact is thus realized between the heat pipe 10 and the absorber plate 1 and a high rigidity of the assembly formed by the absorber plate 1 and the heat pipe 10 is obtained. This assembly is shown in perspective in FIG. 7.

In a practical embodiment, use was made of an iron absorber plate of a length of 920 mm, a width of 617 mm and a thickness of 0.5 mm. This plate was provided with cuts at equal distances of 20 mm. The radius of curvature of the projections 7 and the recesses 6 of the lower die, and hence of the deflected portions 8 and 9, amounted to 8.5 mm. The diameter of the evaporator section 11 of the pipe 10 amounted to 8 mm.

The recesses 16 and 17 had a depth of 4 mm and a width of 9 mm.

Figure 9:
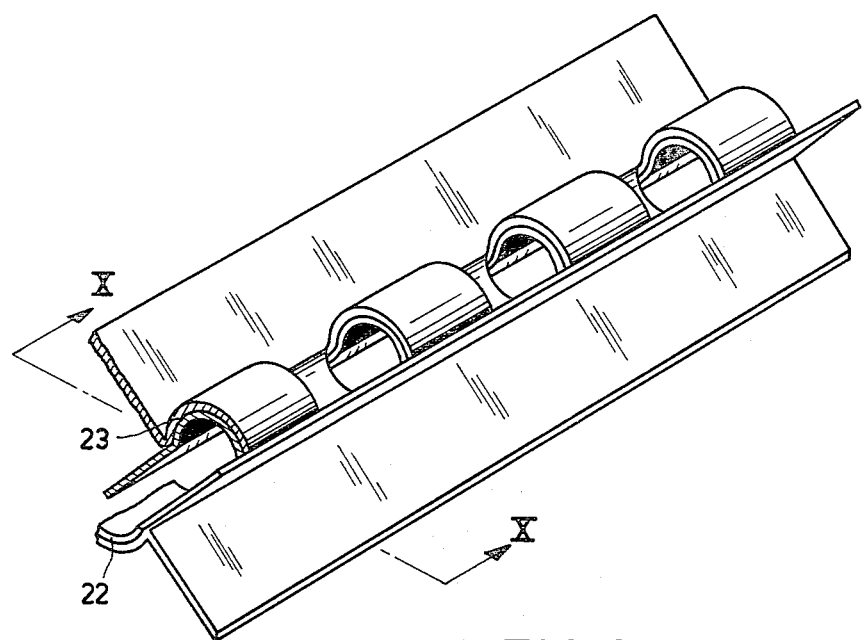
FIGS. 9 and 11 are perspective sectional views of two other embodiments of an absorber plate combined with a heat pipe, FIGS. 10 and 12 being sectional views taken respectively along line X—X of FIG. 9 and along line XII—XII of FIG. 11.
Figure 10:
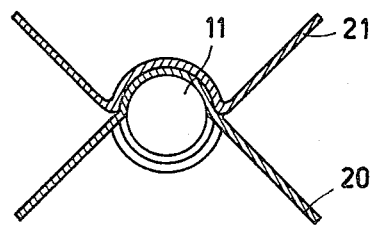

FIGS. 9 and 10 show a further construction which can be realized in the same manner (heat pipe removed). Use is made of two plates 20 and 21 which are arranged one on the other and which are together provided, as described previously for one plate, with portions 22 and 23 which are deflected out of the plane of the plates and wherethrough the evaporator section 11 of a heat pipe is slid. After the execution of the described method, the plates 20 and 21 are bent apart in X-shape, so that four absorber surfaces are obtained.

Figure 11:
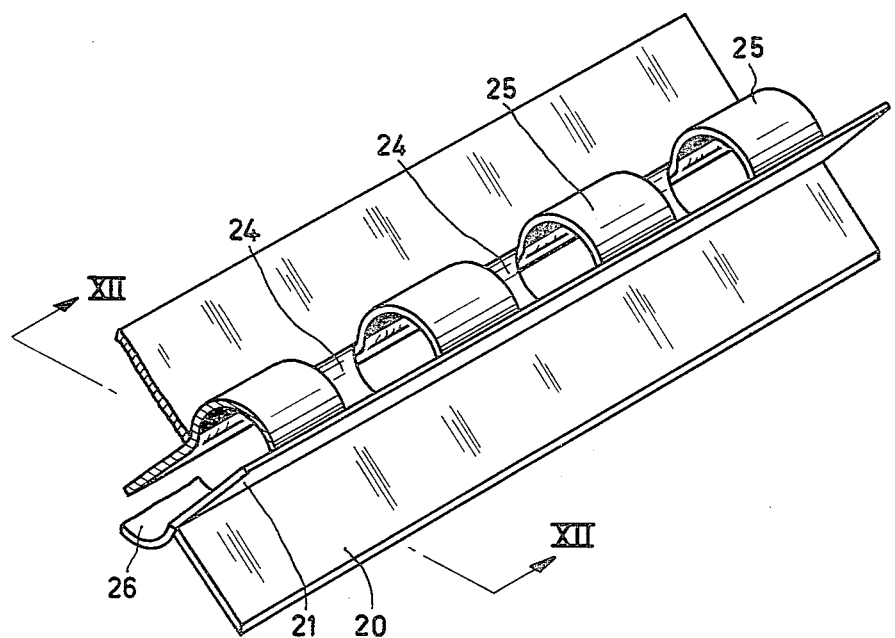
Figure 12:
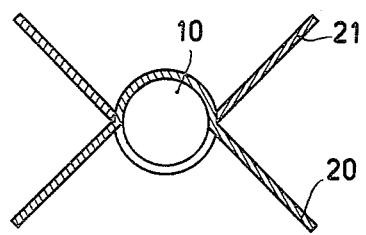

FIG. 11 (heat pipe removed) and FIG. 12 diagrammatically show an embodiment of a heat pipe 10 in combination with two absorber plates, the plates being provided along their longitudinal axes with cut-outs 24 of equal dimensions which are staggered with respect to each other in the plates. Subsequently, the portions 25, 26 situated between the cut-outs are bent out of the plane of the plates in the described manner, after which the deflected portions of the one plate are inserted through the cut-outs of the other plate. Subsequently, the heat pipe is introduced; the pipe may already be clamped by the portions 25 and 26. If necessary, further clamping is realized by means of a press as shown in FIG. 8. After this operation, the plates are suitably thermally conductively connected to the heat pipe. Subsequently, the plates are bent apart into the desired X-shape.

What is claimed is:

1. A method of connecting a straight tubular metal heat pipe having an evaporator section and a condenser section to two elongate flat solar-heat metal absorber plates, which comprises forming a plurality of equally spaced parallel cuts in each absorber plate, said cuts extending transversely of the longitudinal direction of each absorber plate; disposing the two absorber plates one on the other with their respective parallel cuts in alignment; deforming alternate portions between consecutive cuts in opposite directions to provide alternate oppositely disposed semi-cylindrical portions, the two absorber plates remaining in contact with each other; inserting the evaporator section of the tubular heat pipe in the cylindrical space formed by said alternate oppositely disposed semi-cylindrical portions; mechanically pressing said semi-cylindrical portions against the evaporator section of the heat pipe to clamp the absorber plates thereto and to provide thermal conductive contact therewith; and bending the respective remainders of the two absorber plates away from each other into an outwardly extending X-shape with respect to the heat pipe.

2. A method of connecting a straight tubular metal heat pipe having an evaporator section and a condenser section to two elongate flat solar-heat metal absorber plates, which comprises forming a plurality of equally spaced cut-outs in the longitudinal direction of each absorber plate, the length of each cut-out being equal to the spacing between consecutive cut-outs; deforming the portions between consecutive cut-outs of each absorber plate in the same direction to provide spaced semi-cylindrical portions; arranging the two absorber plates in contact with each other with their respective semi-cylindrical portions alternately oppositely disposed; inserting the evaporator section of the tubular heat pipe into the cylindrical space formed by said alternate oppositely disposed semi-cylindrical portions; mechanically pressing said semi-cylindrical portions against the evaporator section of the heat pipe to clamp the absorber plates thereto and to provide thermal conductive contact therewith; and bending the respective remainders of the two absorber plates away from each other into an outwardly extending X-shape with respect to the heat pipe.

* * * * *